(12) United States Patent
Iwamoto

(10) Patent No.: US 8,947,626 B2
(45) Date of Patent: Feb. 3, 2015

(54) LIQUID CRYSTAL DISPLAY HAVING OBLIQUE PIXEL EDGE LINE SEGMENT

(71) Applicant: Stanley Electric Co., Ltd., Meguro-ku, Tokyo (JP)

(72) Inventor: Yoshihisa Iwamoto, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 144 days.

(21) Appl. No.: 13/742,890

(22) Filed: Jan. 16, 2013

(65) Prior Publication Data

US 2013/0182206 A1    Jul. 18, 2013

(30) Foreign Application Priority Data

Jan. 17, 2012 (JP) ................... 2012-007244

(51) Int. Cl.
    *G02F 1/1337*    (2006.01)
    *G02F 1/1343*    (2006.01)
    *G02F 1/139*     (2006.01)

(52) U.S. Cl.
    CPC ........ *G02F 1/1337* (2013.01); *G02F 1/134336* (2013.01); *G02F 1/139* (2013.01); *G02F 2001/134318* (2013.01)
    USPC ............... 349/146; 349/130; 349/145

(58) Field of Classification Search
    CPC . G02F 1/134336; G02F 1/1339; G02F 1/139; G02F 2001/134318
    USPC .......................... 349/130, 145, 146
    See application file for complete search history.

(56) References Cited

U.S. PATENT DOCUMENTS

2009/0086132 A1*  4/2009  Horii et al. ............. 349/103
2010/0097559 A1*  4/2010  Horii ...................... 349/147

FOREIGN PATENT DOCUMENTS

JP    2005-234254 A    9/2005

* cited by examiner

*Primary Examiner* — Michael Caley
(74) *Attorney, Agent, or Firm* — Holtz, Holtz, Goodman & Chick PC

(57) ABSTRACT

A liquid crystal display includes: first and second substrates placed opposite each other; first and second electrodes each provided on one face of the first and second electrodes extending in first and second directions intersecting with each other; and a liquid crystal layer provided between the one face of the first substrate and the one face of the second substrate. A pixel is formed in a region where the first and second electrodes intersect, and a pixel edge of the pixel has a line segment which is oblique relative to the first direction. The first and second substrates are respectively subject to alignment treatment, and the liquid crystal layer is a substantial vertical alignment having a twisted structure, and an alignment direction of liquid crystal molecules at a substantial center in a layer thickness direction and the oblique line segment are not orthogonal.

9 Claims, 14 Drawing Sheets

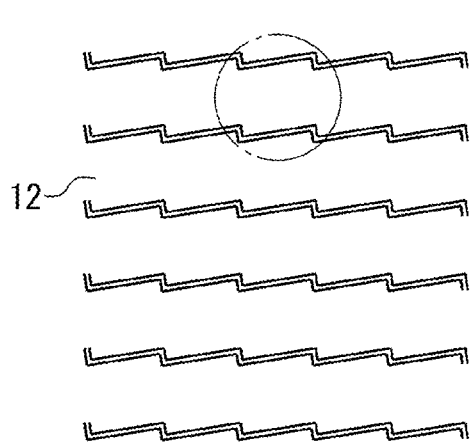
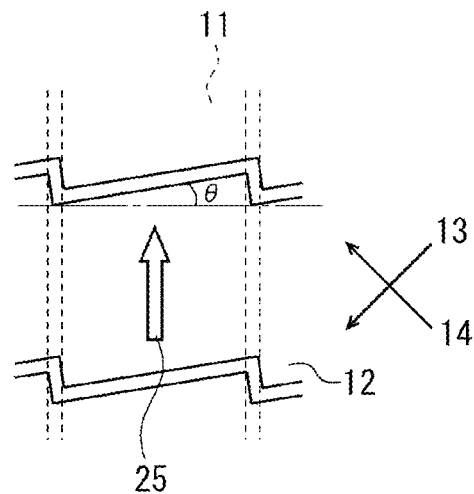
FIG. 7A          FIG. 7B
FIG. 8
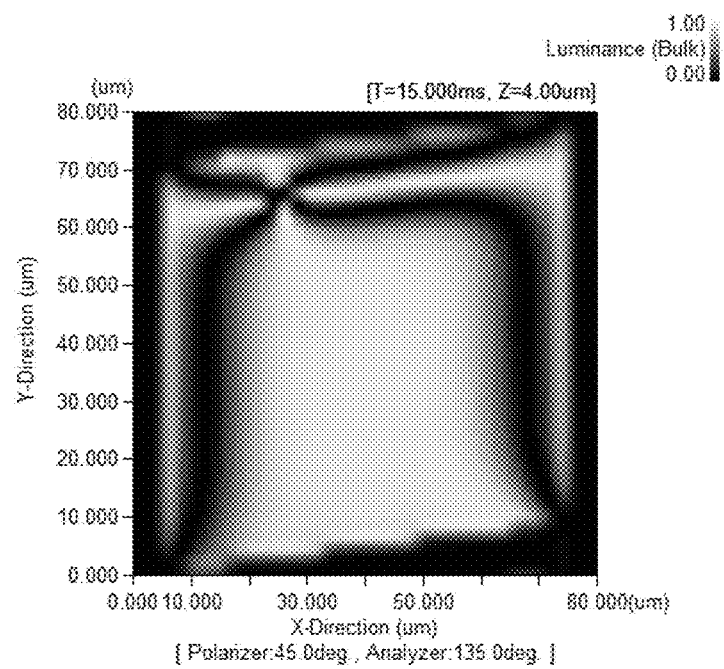

FIG. 11
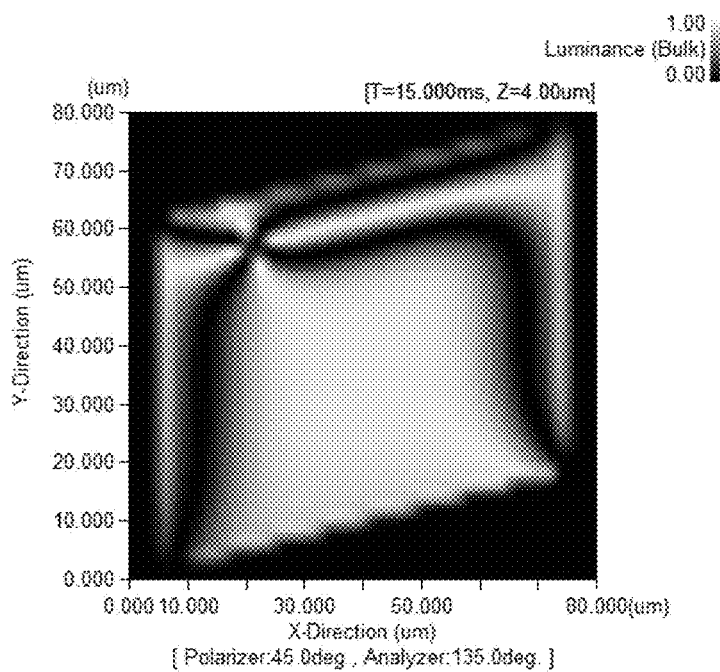
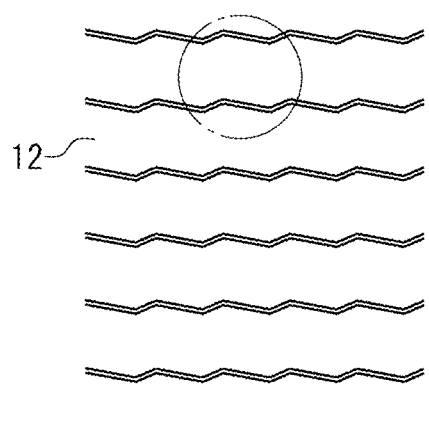
FIG. 12A
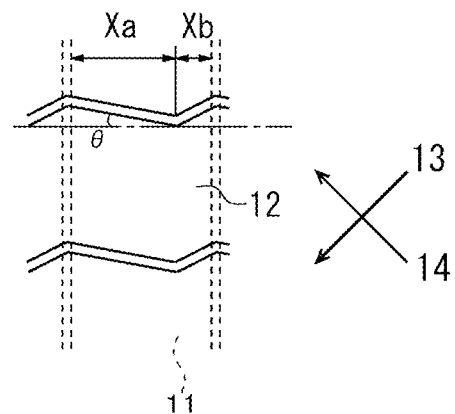
FIG. 12B

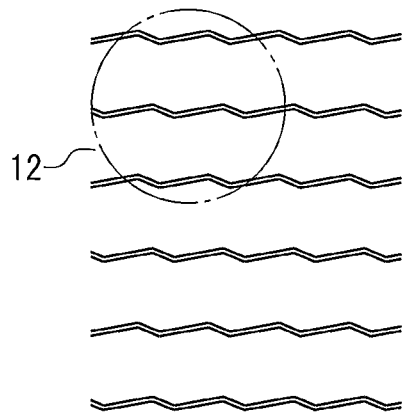
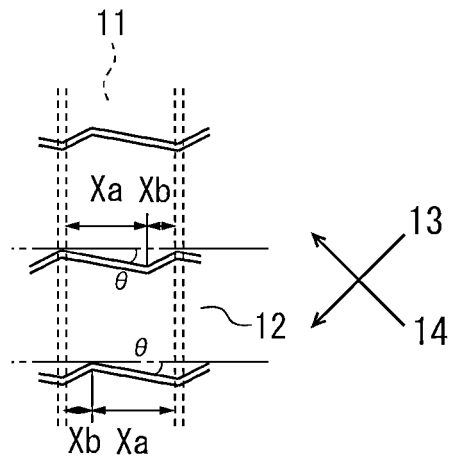
FIG. 13A  FIG. 13B
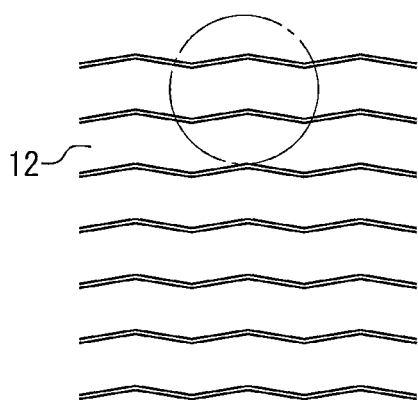
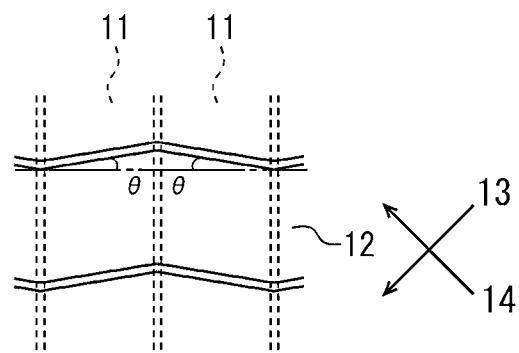
FIG. 14A  FIG. 14B

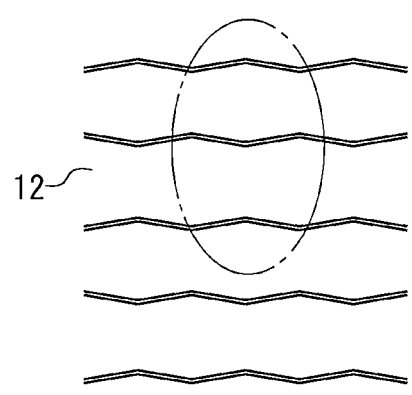
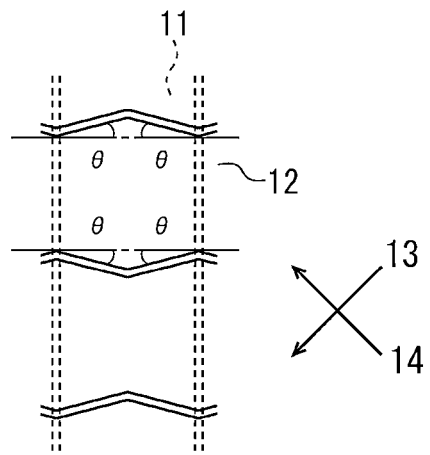
FIG. 17A    FIG. 17B
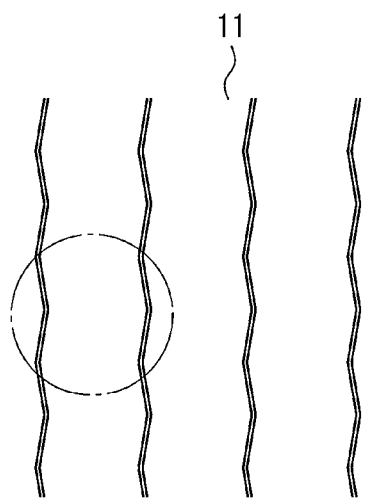
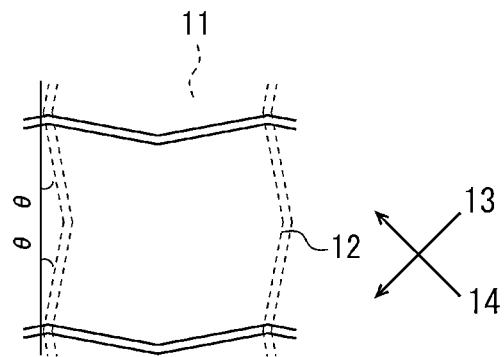
FIG. 18A    FIG. 18B FIG. 23
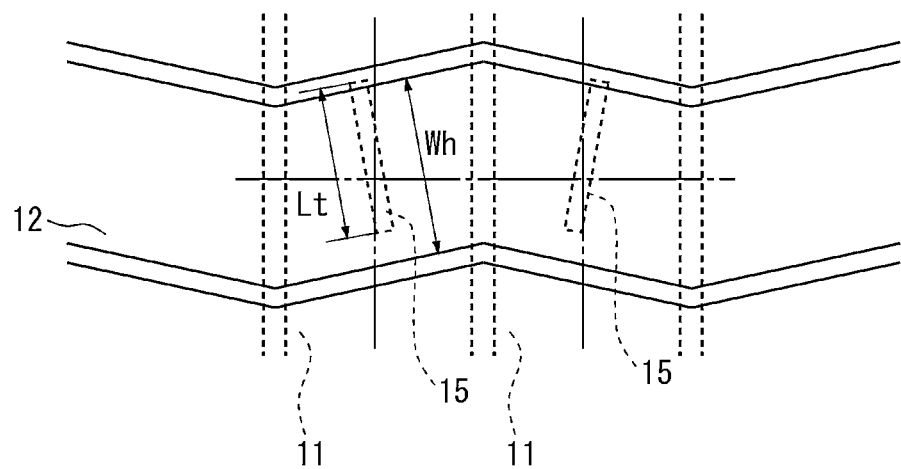
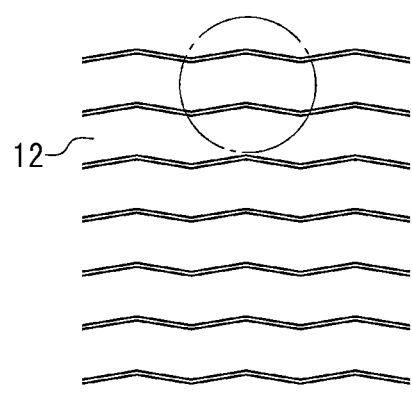
FIG. 24A
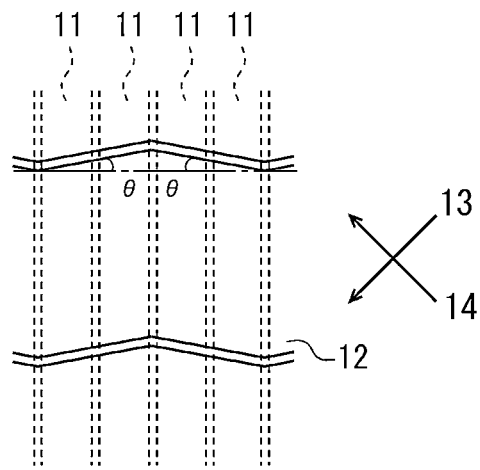
FIG. 24B

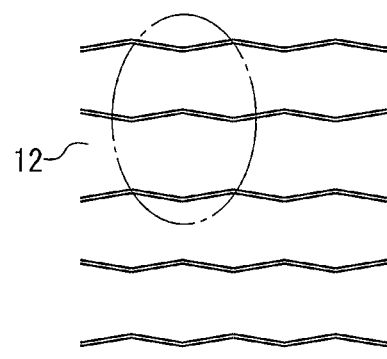
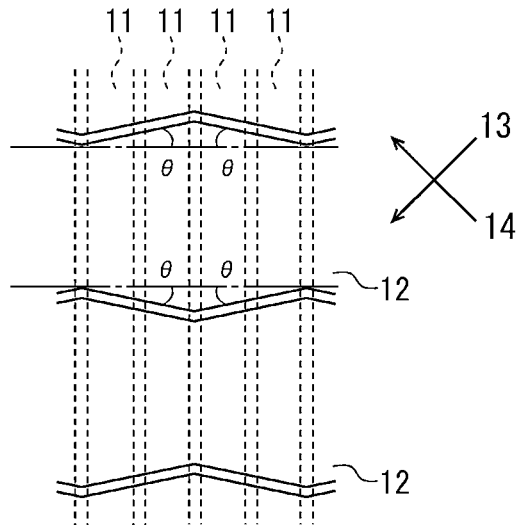
FIG. 25A    FIG. 25B
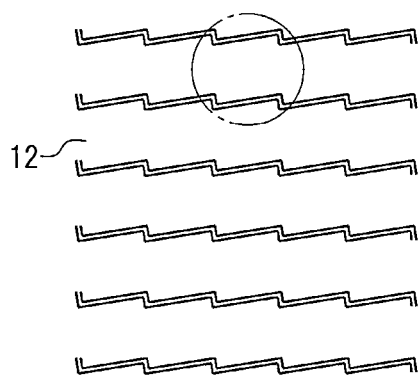
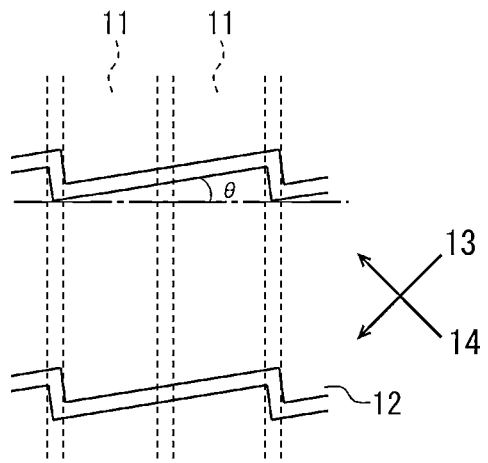
FIG. 26A    FIG. 26B

LIQUID CRYSTAL DISPLAY HAVING OBLIQUE PIXEL EDGE LINE SEGMENT

BACKGROUND OF THE INVENTION

1. Field of the Invention

The present invention relates to a vertical alignment liquid crystal display that is driven by multiplex driving.

2. Description of the Related Art

A liquid crystal display is widely used, for example, as an information display unit in various electronic devices for consumer use and automobile use. A general liquid crystal display is configured by disposing a liquid crystal layer made of a liquid crystal material between two substrates disposed facing each other by providing a gap of about several nm therebetween. As one type of liquid crystal display described above, known is a vertical alignment liquid crystal display (for example, JP-A-2005-234254). A vertical alignment liquid crystal display comprises, as its main configuration, liquid crystal cells of a vertical alignment mode in which liquid crystal molecules in a liquid crystal layer disposed between two substrates are aligned substantially vertically relative to the surface of the respective substrates, and polarizers provided respectively to the outer side of these liquid crystal cells. The respective polarizers are often of a crossed Nicol arrangement. As a result of adopting this configuration, the transmittance of the liquid crystal display during the non-application of voltage will become extremely low and, therefore, a high contrast can be realized relatively easily.

When realizing the display of images of a liquid crystal display based on multiplex driving, for example, substrates having electrodes which are respectively formed in a stripe shape are disposed to face each other so that the extending directions of the respective electrodes are substantially orthogonal, and each region where the electrode of one substrate and the electrode of the substrate intersect is used as a pixel. Here, the shape of each pixel is substantially rectangular. Moreover, alignment treatment such as rubbing treatment is performed to the surface of the respective substrates. The direction of performing the alignment treatment to the surface of the respective substrates is set, for example, to opposite directions (anti-parallel alignment). Consequently, the alignment direction of the liquid crystal molecules of the liquid crystal layer provided between the substrates at the substantial center in the layer thickness direction during the non-application of voltage will orient a single direction. For example, when the direction of the alignment treatment performed to the respective substrates is set to a 6 o'clock direction and a 12 o'clock direction when viewed from a front view of the liquid crystal display, the alignment direction of the liquid crystal molecules at the substantial center of the liquid crystal layer in the layer thickness direction will orient in the 6 o'clock direction. Here, the extending direction of the electrode of one side substrate becomes substantially parallel to the alignment direction of the liquid crystal molecules at the substantial center of the liquid crystal layer in the layer thickness direction, and the extending direction of the electrode of the other substrate becomes substantially orthogonal. Moreover, the initial alignment state of the liquid crystal layer may be a twisted alignment state.

In a liquid crystal display of the foregoing vertical alignment mode, considered may be a case where a pair of polarizers in a substantial crossed Nicol arrangement is disposed at the outer side of the respective substrates. Let it be assumed that an absorption axis of one polarizer is disposed at an angle of approximately 45° relative to the direction of the alignment treatment performed to one side substrate. When forming a liquid crystal layer using a liquid crystal material having negative dielectric constant anisotropy and applying voltage of a threshold voltage or higher between the electrodes of the respective substrates, most of the liquid crystal molecules in the liquid crystal layer will tilt to a horizontal alignment direction according to the alignment treatment direction. When observing this liquid crystal display, a light display state is favorably observed from the 6 o'clock direction, but contrarily a light display state cannot be observed from the 12 o'clock direction. Here, the 6 o'clock direction is referred to as an optimal viewing direction (optimal viewing orientation), and the 12 o'clock direction is referred to as an anti-viewing direction (anti-viewing orientation).

In a liquid crystal display of the foregoing vertical alignment mode, when the liquid crystal display is viewed from the anti-viewing direction in a state where the liquid crystal display is of a light display state from a front view, the inside of the pixels will be observed as a substantially dark state, but a light leak will occur near one side among the four sides (pixel edges) of a rectangular pixel. This light leak is non-uniformity in its developmental state and differs by pixel, and considerably drops the display quality in terms of appearance.

Moreover, in a liquid crystal display of the foregoing vertical alignment mode, there are cases where a dark region occurs in the respective pixels in a state where the liquid crystal display is of a light display state from a front view during multiplex driving, thereby causing the display quality to drop. Since this phenomenon occurs more notably when the frame frequency is decreased, the drive frequency needs to be set higher in order to eliminate this phenomenon. Nevertheless, when the drive frequency is increased, the consumption current increases as a result of the impedance between the electrodes increasing, and, in addition to the load of the drive device increasing, the potential difference of the electrodes also becomes notable, causing the display quality to drop. Specifically, this increases the potential of so-called cross-talk.

SUMMARY OF THE INVENTION

One object of a specific mode of the present invention is to improve the display quality in a vertical alignment liquid crystal display, which is driven by multiplex driving, by homogenizing the light leak that occurs near the edge of the respective pixels during the observation from an anti-viewing direction.

One object of another specific mode of the present invention is to improve the display quality in a vertical alignment liquid crystal display, which is driven by multiplex driving, by homogenizing the light leak that occurs near the edge of the respective pixels during the observation from an anti-viewing direction, as well as realize display uniformity, with the lowest frame frequency possible, when the liquid crystal display is viewed from the front side.

A liquid crystal display according to one aspect of the present invention includes: (a) a first substrate and a second substrate placed opposite each other; (b) a first electrode provided on one face of the first substrate and which extends in a first direction; (c) a second electrode provided on one face of the second substrate and which extends in a second direction that intersects with the first direction; and (d) a liquid crystal layer provided between the one face of the first substrate and the one face of the second substrate, (e) wherein a pixel is formed in a region where the first electrode and second electrode intersect, (f) wherein a pixel edge of the pixel has a line segment which is oblique relative to the first direction, (g) wherein at least one of the first substrate and the second substrate is subject to alignment treatment, and (h) wherein the liquid crystal layer is a substantial vertical alignment having a twisted structure, and an alignment direction of liquid crystal molecules at a substantial center in a layer thickness direction and the oblique line segment are not orthogonal. The alignment direction of the liquid crystal molecules at the substantial center in the layer thickness direction of the liquid crystal layer is substantially parallel to or anti-parallel to the first direction. In this specification, "oblique" means an angle other than right angle, and "intersects obliquely" means intersecting at an angle other than right angle.

According to above-described constitution, the alignment direction of liquid crystal molecules at the substantial center in the layer thickness direction of the liquid crystal layer intersects obliquely with the pixel edge, thereby improving the display quality, especially the display quality during the observation from an anti-viewing direction.

Preferably, the oblique line segment forms an oblique angle from greater than 0° to 15° or below relative to the second direction.

Preferably, the oblique line segment is configured by connecting a first straight line and a second straight line extending in different directions. In this case, preferably, the first straight line and the second straight line are of a relation where, when a length of the first straight line and a length of the second straight line projected in the first direction are respectively Xa and Xb, Xa is three times or more than Xb, and the first straight line forms an oblique angle from greater than 0° to 15° or below relative to the second direction.

Preferably, the oblique line segment is configured by a first straight line and a second straight line of which lengths are substantially equal, and which extend in different directions respectively. In this case, preferably, each of the first straight line and the second straight line forms an oblique angle from greater than 0° to 15° or below relative to the second direction.

Preferably, the oblique line segment is disposed on an anti-viewing direction side of the pixel edge.

BRIEF DESCRIPTION OF THE DRAWINGS

FIG. 7A and FIG. 7B are schematic plan views showing an example of the electrode structure;

FIG. 8 is a diagram showing a simulation result of one pixel in alignment texture of the liquid crystal display of the first embodiment;

FIG. 11 is a diagram showing a simulation result of one pixel in alignment texture of the liquid crystal display of the first embodiment;

FIG. 12A and FIG. 12B are schematic plan views showing another example of the electrode structure;

FIG. 13A and FIG. 13B are schematic plan views showing another example of the electrode structure;

FIG. 14A and FIG. 14B are schematic plan views showing another example of the electrode structure;

FIG. 17A and FIG. 17B are schematic plan views showing another example of the electrode structure;

FIG. 18A and FIG. 18B are schematic plan views showing another example of the electrode structure;

FIG. 23 is a diagram showing another example of the electrode structure;

FIG. 24A and FIG. 24B are diagrams showing another example of the electrode structure;

FIG. 25A and FIG. 25B are diagrams showing another example of the electrode structure;

FIG. 26A and FIG. 26B are diagrams showing another example of the electrode structure.

DESCRIPTION OF THE PREFERRED EMBODIMENTS

The inventors of the present application examined, based on simulation results, the cause of the non-uniform display that occurs particularly when the liquid crystal display is viewed from an anti-viewing direction in a case where the vertical alignment liquid crystal display is driven by multiplex driving.

Foremost, as reference example 1, examined was a liquid crystal display having a structure where an upper electrode and a lower electrode respectively formed in a stripe shape are disposed orthogonally, and a liquid crystal layer is disposed between the upper electrode and the lower electrode. Moreover, alignment treatment was performed to a lower substrate provided with the lower electrode along a 12 o'clock direction, which is a longitudinal direction (extending direction) of the lower electrode, and alignment treatment was not performed to an upper substrate provided with the upper electrode. The pattern cycle of the upper electrode and the lower electrode was set to 80 µm, and the distance between the respectively adjacent electrodes was set to 10 nm. One pixel is of an 80 µm×80 µm rectangular shape. During the calculation, the inside of this rectangular pixel was partitioned in equal intervals of 40×40 sections vertically and horizontally, and the thickness direction of the liquid crystal layer was partitioned into 20 sections. The pre-tilt angle was set to 89.5°, and the liquid crystal layer thickness (cell thickness)

was set to 4 μm, and the dielectric constant anisotropy of the liquid crystal material was set to −5.1. Assuming ideal polarization properties in the respective polarizers disposed in a manner of being sandwiched between the upper substrate and the lower substrate, the polarizers were configured in a crossed Nicol arrangement where one absorption axis was set to 45° in a clockwise direction relative to the extending direction of the upper electrode, and the other absorption axis was set to 45° in a counterclockwise direction relative to the extending direction of the upper electrode. Based on the foregoing conditions, voltage was applied to one pixel, and the alignment texture at the time of achieving a steady state was reproduced via simulation analysis.

Figure 1:
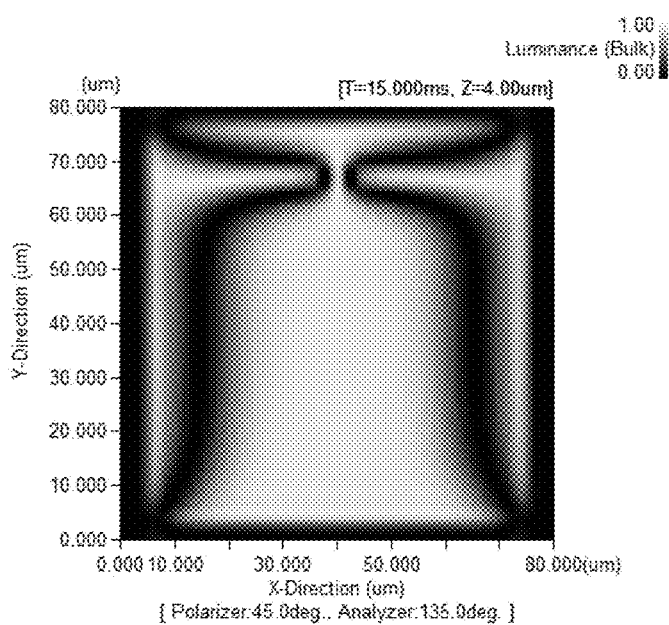
FIG. 1 is a diagram showing a simulation result of one pixel in alignment texture of the liquid crystal display of reference example 1.

FIG. 1 is a diagram showing a simulation result of one pixel in alignment texture of the liquid crystal display of reference example 1. As shown in FIG. 1, it can be seen that two dark regions are observed along the upper edge and the left-right edges of the pixel, and that the dark regions are mutually intersecting. The reason that these dark regions occur has been identified as follows. Specifically, due to the influence of the fringe electric field generated near the pixel edge during the application of voltage, a region where the liquid crystal molecules at the substantial center of the liquid crystal layer in the layer thickness direction (hereinafter referred to as the "liquid crystal layer center molecules") become aligned is created in a direction that is different from the alignment direction that was defined by the alignment treatment performed to the substrate surface, and, based on the analysis of director distribution, it has been confirmed that the dark regions are generated due to a director of the liquid crystal layer center molecules rotating between the foregoing region and the region where the liquid crystal layer center molecules are aligned along the alignment treatment. In other words, dark regions will emerge if the director of the liquid crystal layer center molecules is aligned in a direction that is substantially parallel to the respective absorption axes of the two polarizers. The point where the lines of the two dark regions intersect is an alignment defect known as disclination, and, at this disclination, regardless of the applied voltage, the director of the liquid crystal layer center molecules is maintained in a substantial vertical alignment state. Note that, while the position that the disclination emerged in this simulation result was at the substantial center relative to the left-right edges of the pixel, when a liquid crystal display is actually manufactured, the position that the disclination emerges becomes random by pixel due to various factors, and this fact causes the display quality to drop when the liquid crystal display is observed from the anti-viewing direction.

Next, examined was a case where a 90° twisted structure was introduced into the liquid crystal layer of the liquid crystal display of foregoing reference example 1. Specifically, with respect to the liquid crystal display of reference example 2, by defining the alignment direction to the lower substrate in a direction that is 45° counterclockwise relative to the 12 o'clock direction, and defining the alignment direction to the upper substrate in a direction that is 225° clockwise relative to the 12 o'clock direction, the liquid crystal layer was set to a left 90° twisted alignment, and the alignment direction of the liquid crystal layer center molecules was set to the 12 o'clock direction. The other conditions were the same as reference example 1. Moreover, with respect to the liquid crystal display of reference example 3, by defining the alignment direction to the lower substrate in a direction that is 45° clockwise relative to the 12 o'clock direction, and defining the alignment direction to the upper substrate in a direction that is 225° counterclockwise relative to the 12 o'clock direction, the liquid crystal layer was set to a right 90° twisted alignment, and the alignment direction of the liquid crystal layer center molecules was set to the 12 o'clock direction. The other conditions were the same as reference example 1. Based on the foregoing conditions, voltage was applied to one pixel, and the alignment texture at the time of achieving a steady state was reproduced via simulation analysis.

Figure 2:
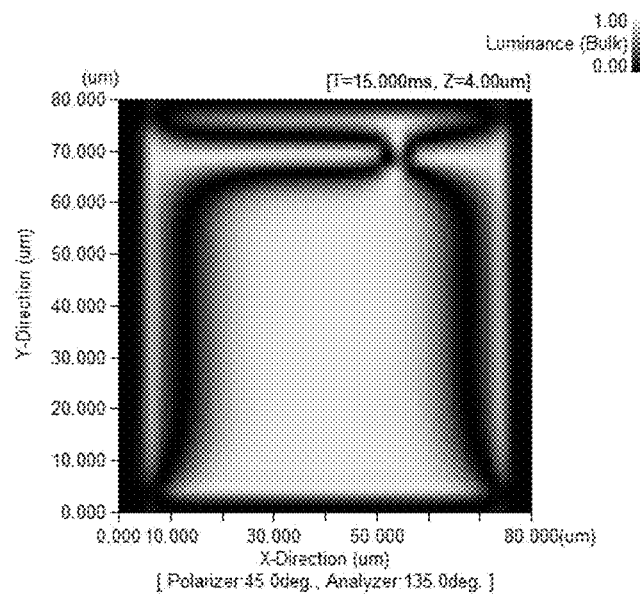
FIG. 2 is a diagram showing a simulation result of one pixel in alignment texture of the liquid crystal display of reference example 2.
Figure 3:
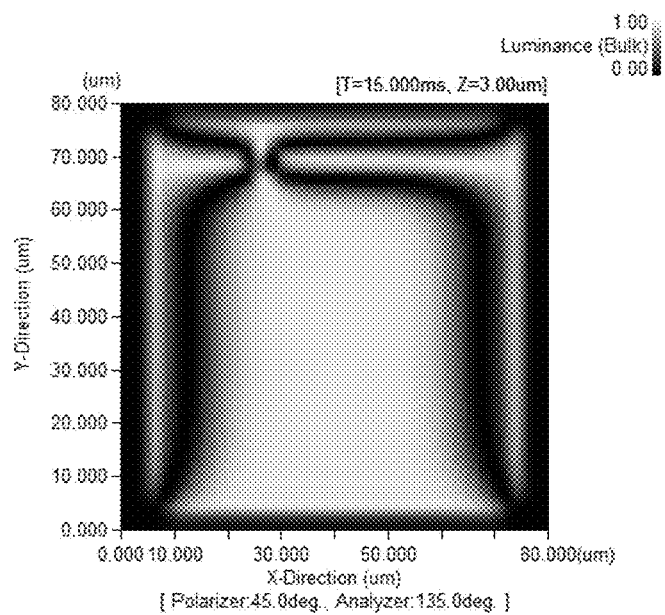
FIG. 3 is a diagram showing a simulation result of one pixel in alignment texture of the liquid crystal display of reference example 3.

FIG. 2 is a diagram showing a simulation result of one pixel in alignment texture of the liquid crystal display of reference example 2. Moreover, FIG. 3 is a diagram showing a simulation result of one pixel in alignment texture of the liquid crystal display of reference example 3. As shown in FIG. 2 and FIG. 3, as with the case of the liquid crystal display of reference example 1, two dark regions were also observed in the respective liquid crystal displays of reference examples 2 and 3 along the upper edge and left-right edges of the pixel, and it can be seen that the dark regions are mutually intersecting. Nevertheless, the disclination as the intersecting point thereof did not emerge at the substantial center relative to the left-right edges, and it was confirmed that the position of disclination becomes displaced to the left or right based on the twisting direction. Specifically, in this simulation result, it was confirmed that the disclination is displaced to the right side within the pixel in the case of a left 90° twist as shown in FIG. 2, and the disclination is displaced to the left side within the pixel in the case of a right 90° twist as shown in FIG. 3.

Figure 4:
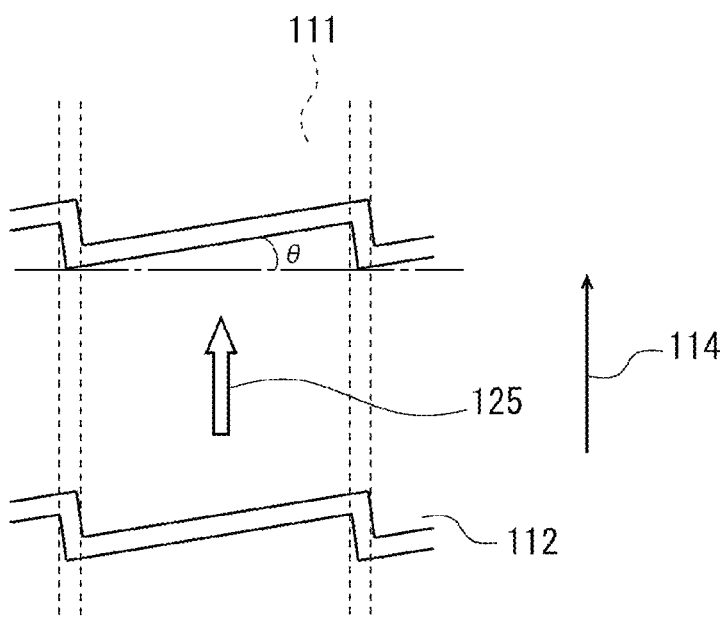
FIG. 4 is a schematic plan view showing an electrode structure of the liquid crystal display of reference example 4.

The results of examining the liquid crystal display with a changed electrode structure are now explained. In foregoing reference examples 1 to 3, examined was a case where both the upper electrode and the lower electrode are a stripe shape, and the pixel as the orthogonal region thereof is a rectangular shape. In reference example 4, examined was a case where the lower electrode is bent in regular intervals while extending in one direction, the upper electrode is a stripe shape, and the pixel as the orthogonal region thereof is a substantial parallelogram. FIG. 4 is a schematic plan view showing the electrode structure of the liquid crystal display of reference example 4. As shown in FIG. 4, the electrode edge of the lower electrode 112 extending in the left-right direction in the diagram is formed in a saw-like shape, and one pitch of the saw teeth substantially coincides with the electrode width of the upper electrode 111. Note that, for the sake of convenience, the upper electrode 111 extending in the vertical direction in the diagram is shown with dotted lines in FIG. 4. Since the region where the upper electrode 111 and the lower electrode 112 intersect becomes one pixel, the shape of this one pixel becomes a substantial parallelogram that is demarcated by two sides of the electrode edge of the upper electrode 111 and two sides of the electrode edge of the lower electrode 112. Note that, in the simulation analysis of reference example 4, the conditions other than the pixel shape were set to be the same as reference example 1. In other words, alignment treatment was performed to the lower substrate along the 12 o'clock direction as the longitudinal direction (extending direction) of the lower electrode (refer to the direction 1134 of the alignment treatment), and alignment treatment was not performed to the upper substrate provided with the upper electrode. In addition, the liquid crystal layer does not have a twisted structure, and the alignment direction 125 of the liquid crystal layer center molecules becomes the 12 o'clock direction as shown in the diagram. Moreover, the angle θ formed by the electrode edge of the lower electrode 112 and the horizontal direction (left-right direction in the diagram) was set to 7.1°.

Figure 5:
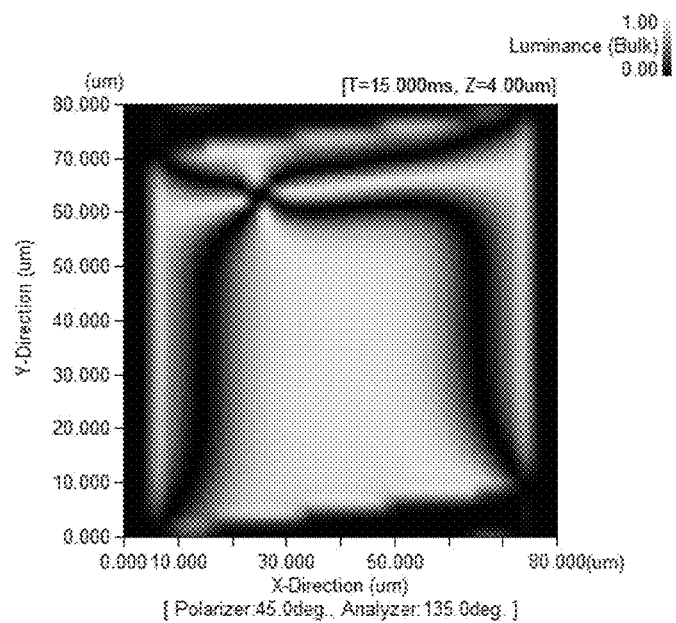
FIG. 5 is a diagram showing a simulation result of one pixel in alignment texture of the liquid crystal display of reference example 4.

FIG. 5 is a diagram showing a simulation result of one pixel in alignment texture of the liquid crystal display of reference example 4. As shown in FIG. 5, two dark regions were also observed in the liquid crystal displays of reference example 4 along the upper edge and left-right edges of the pixel, and it can be seen that the dark regions are mutually intersecting. Nevertheless, it can be seen that the disclination at the intersecting point has shifted to the upper left pixel corner direction within the pixel. Note that, when a liquid crystal display was actually manufactured under the same conditions, the same tendency as this simulation result was observed. In other words, the tendency of the disclination in all pixels shifting to the upper left corner within the pixel was obtained. Consequently, by reducing as much as possible the orthogonal portions of the pixel edge and the alignment direction 125 (refer to FIG. 4) of the liquid crystal layer center molecules, it is considered that the shape of the dark regions generated in the respective pixels can be made uniform, and in particular it is assumed that the visibility from the anti-viewing direction can be improved, and the display quality of the liquid crystal display can thereby be improved.

Embodiments of the present invention are now explained based on the foregoing discovery.

Figure 6:
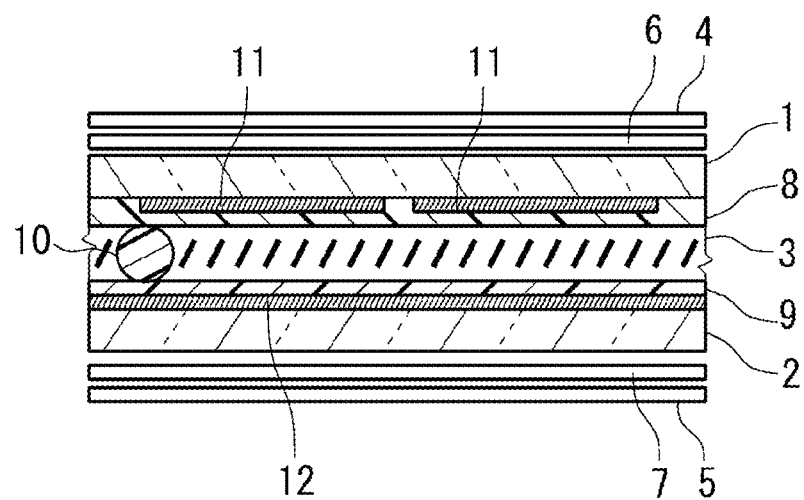
FIG. 6 is a schematic cross section showing a structure of the liquid crystal display of an embodiment of the present invention.

FIG. 6 is a schematic cross section showing a structure of the liquid crystal display of an embodiment of the present invention. The liquid crystal display shown in FIG. 6 mainly comprises a first substrate 1 and a second substrate 2 placed opposite each other, and a liquid crystal layer 3 disposed between the two substrates. A first polarizer 4 is disposed at the outer side of the first substrate 1, and a second polarizer 5 at the outer side of the second substrate 2. A first viewing angle compensator 6 is disposed between the first substrate 1 and the first polarizer 4, and a second viewing angle compensator 7 is disposed between the second substrate 2 and the second polarizer 5. The periphery of the liquid crystal layer 3 is sealed with a seal member (not shown). The structure of the liquid crystal display is now explained in further detail.

The first substrate 1 and the second substrate 2 are respectively, for example, transparent substrates such as glass substrates or plastic substrates. Spacers 10 are dispersed and disposed mutually between the first substrate 1 and the second substrate 2. As a result of these spacers 10, the gap between the first substrate 1 and the second substrate 2 is maintained at a predetermined distance (approximately 4.0 μm in this embodiment).

The liquid crystal layer 3 is provided mutually between the first electrode 11 of the first substrate 1 and the second electrode 12 of the second substrate 2. In this embodiment, the liquid crystal layer 3 is configured using a liquid crystal material (nematic liquid crystal material) in which the dielectric constant anisotropy $\Delta\varepsilon$ is negative ($\Delta\varepsilon<0$). With the liquid crystal layer 3, the alignment state of the liquid crystal molecules is restricted to a mono-domain alignment. The pre-tilt angle of the liquid crystal layer 3 is set to, for example, about 89.5°.

The first polarizer 4 and the second polarizer 5 are disposed so that their respective absorption axes are mutually substantially orthogonal. Moreover, with the first polarizer 4 and the second polarizer 5, one absorption axis of the two is disposed 45° clockwise relative to the extending direction of the first electrode 11, and the absorption axis of the other is disposed 45° counterclockwise relative to the extending direction of the first electrode 11. Consequently, the absorption axes of the first polarizer 4 and the second polarizer 5 form an angle of approximately 45° relative to the alignment direction of the liquid crystal layer center molecules defined by the directions 13, 14 of the respective alignment treatments.

An alignment film 8 is provided to one face side of the first substrate 1 in a manner of covering the first electrode 11. Similarly, an alignment film 9 is provided to one face side of the second substrate 2 in a manner of covering the second electrode 12. In this embodiment, used as the alignment film 8 and the alignment film 9 is a film (vertical alignment film) capable of regulating the alignment state during the initial state (non-application of voltage) of the liquid crystal layer 3 to a vertical alignment state. More specifically, as the respective alignment films 8, 9, used is a film that is capable of providing a pre-tilt angle of nearly 90° relative to the liquid crystal molecules of the liquid crystal layer 3.

Alignment treatment such as rubbing treatment is performed to the respective alignment films 8, 9. The direction 13 of the alignment treatment performed to the alignment film 8 is the direction of 225° clockwise relative to the 12 o'clock direction at the front face of the liquid crystal display. Moreover, the direction 14 of the alignment treatment performed to the alignment film 9 is the direction of 45° counterclockwise relative to the 12 o'clock direction at the front face of the liquid crystal display. Consequently, the alignment of the liquid crystal layer 3 becomes a left 90° twisted alignment, and the alignment direction of the liquid crystal layer center molecules becomes the 12 o'clock direction. Note that the direction 13 of the alignment treatment performed to the alignment film 8 may be a direction of 45° clockwise relative to the 12 o'clock direction, and the direction 14 of the alignment treatment to be performed to the alignment film 9 may be a direction of 225° counterclockwise relative to the 12 o'clock direction. In the foregoing case, the alignment of the liquid crystal layer 3 becomes a right 90° twisted alignment, and the alignment direction of the liquid crystal layer center molecules becomes the 12 o'clock direction. Alignment treatment may be performed to at least one of the alignment film 8 of the first substrate 1 and the alignment film 9 of the second substrate 2.

The first electrode 11 is provided on one face of the first substrate 1. Moreover, the second electrode 12 is provided on one face of the second substrate 2. In this embodiment, a plurality of first electrodes 11 and a plurality of second electrodes 12 respectively extending in a specific direction are placed opposite each other by causing their respective extending directions to be substantially orthogonal. The respective first electrodes 11 and the respective second electrodes 12 are configured by suitably patterning a transparent conductive film made of indium tin oxide (ITO) or the like. With the liquid crystal display of this embodiment, the respective portions where the first electrode 11 and the second electrode 12 overlap in a plan view become a pixel. In this embodiment, by causing the electrode edge of the respective second electrodes 12 to have a broken curve shape containing a line segment that is oblique to the extending direction (first direction) of the first electrode, realized is a structure where the pixel edge of the portion among the respective pixels that is demarcated by the electrode edges of the respective second electrodes and the alignment direction 25 of the liquid crystal layer center molecules do not become orthogonal.

FIG. 7A and FIG. 7B are schematic plan views shown an example of the electrode structure. As shown in FIG. 7A, the electrode edge of the respective second electrodes 12 extending in the left-right direction in the diagram is formed in a saw-like shape, and one pitch of the saw teeth substantially coincides with the electrode width of the respective first electrodes 11. FIG. 7B is an enlarged view of the electrode portion corresponding to one pixel. In FIG. 7B, the respective first electrodes 11 extending in the vertical direction in the diagram are shown with dotted lines. Since the region where the respective first electrodes 11 and the respective second electrodes 12 intersect becomes one pixel, the shape of this one pixel becomes a substantial parallelogram that is demarcated by two sides of the electrode edge of the first electrode 11 and two sides of the electrode edge of the second electrode 12, and the shape of all pixels becomes equal. When the angle formed by the electrode edge of the second electrode 12 having a saw-like shape and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 of the liquid crystal layer center molecules do not become orthogonal. Note that, while the electrode edge of the second electrodes 12 shown in FIGS. 7A and 7B has a saw-like shape rising to the right, similar effects can be obtained even with a saw-like shape falling to the right.

Figure 9:
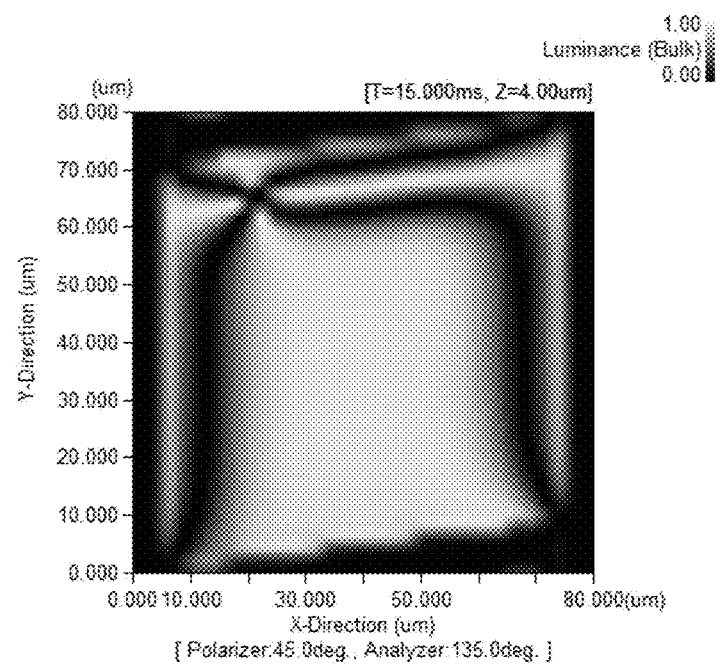
FIG. 9 is a diagram showing a simulation result of one pixel in alignment texture of the liquid crystal display of the first embodiment.

FIG. 8 and FIG. 9 are diagrams respectively showing a simulation result of one pixel in alignment texture of the liquid crystal display of the first embodiment. Specifically, FIG. 8 shows a simulation result where the liquid crystal layer 3 has a left 90° twisted alignment, and FIG. 9 shows a simulation result where the liquid crystal layer 3 has a right 90° twisted alignment. Moreover, in both simulations, the angle θ formed by the electrode edge of the second electrode 12 and the horizontal direction was set to 7.1°. The other simulation conditions were the same as the case of the foregoing reference examples. As evident from FIG. 8 and FIG. 9, the position of disclination as the intersecting point of the two dark regions is positioned more on the left side than the center relative to the left-right pixel edges in both cases regardless of the twisting direction of the alignment of the liquid crystal layer 3. With the foregoing reference examples, the position of disclination was dependent on the twisting direction of the alignment, but in this embodiment the position of disclination emerges on the left side regardless of the twisting direction of the alignment of the liquid crystal layer. Note that, when a liquid crystal display was actually manufactured under the same conditions, the same tendency as this simulation result was observed. In other words, the tendency of the disclination in all pixels being fixed at the upper left corner within the pixel was obtained. Consequently, by reducing as much as possible the orthogonal portions of the pixel edge and the alignment direction 25 (refer to FIGS. 7A and 7B) of the liquid crystal layer center molecules, it is considered that the shape of the dark regions generated in the respective pixels can be made uniform, and in particular it is assumed that the visibility from the anti-viewing direction can be improved, and the display quality of the liquid crystal display can thereby be improved.

Figure 10:
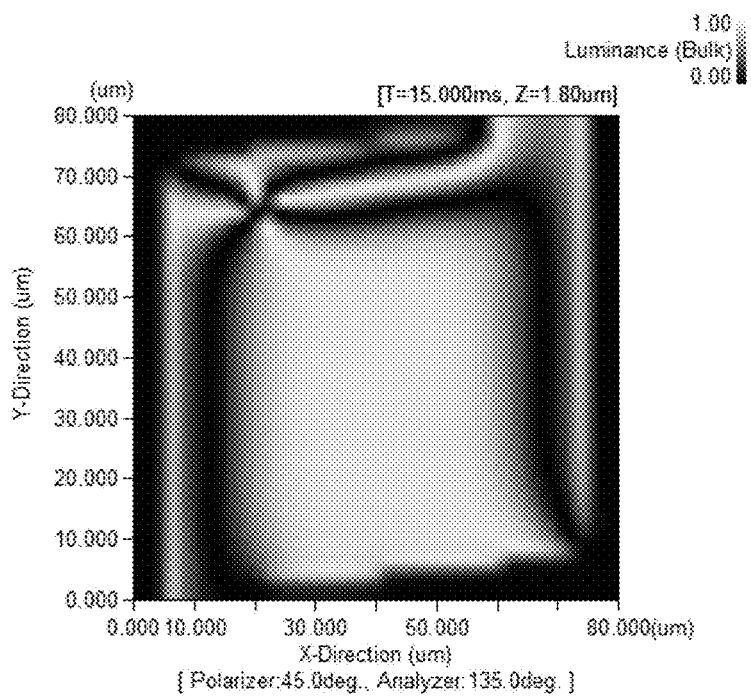
FIG. 10 is a diagram showing a simulation result of one pixel in alignment texture of the liquid crystal display of the first embodiment.

Next, a case of changing the angle θ formed by the electrode edge of the second electrode 12 and the horizontal direction is also explained. FIG. 10 and FIG. 11 are diagrams respectively showing a simulation result of one pixel in alignment texture of the liquid crystal display of the first embodiment. Specifically, FIG. 10 shows a simulation result where the angle θ is set to 5.7°, and FIG. 11 shows a simulation result where the angle θ is set to 14°. In both simulations, the liquid crystal layer 3 was set to a left twisted alignment. The other simulation conditions were the same as the case of the foregoing reference examples. As evident from FIG. 10 and FIG. 11, the position of disclination as the intersecting point of the two dark regions is positioned more on the left side than the center relative to the left-right pixel edges in both cases regardless of the size of the angle θ. However, when the influence of the angle θ was subject to further simulation analysis, the analysis result was such that a plurality of discliniations will occur when the angle θ is less than 5°. Consequently, it could be said that the angle θ is preferably set to 5° or more.

Note that various modes may be considered in addition to the foregoing embodiment regarding the electrode structure and the shape of pixels that are demarcated thereby. These modified modes are now explained.

FIG. 12A and FIG. 12B are schematic plan views showing another example of the electrode structure. As shown in FIG. 12A, while the electrode edge of the respective second electrodes 12 extending in the left-right direction in the diagram is formed in a saw-like shape, unlike the structure of the foregoing embodiment, one pitch of the saw teeth does not coincide with the electrode width of the respective first electrodes 11. In addition, as shown in FIG. 12B, with the respective second electrodes 12, the downward apex angle portion of the saw teeth and the interelectrode portion of the first electrode 11 are in a non-overlapping state. The respective upper and lower electrode edges in one pixel are formed in a shape where two sides (first straight line and second straight line) of different sloping directions are connected. When the length components (projected lengths) of the respective electrode edges that are parallel in the left-right direction are Xa and Xb, the total length of Xa and Xb and the electrode width of the respective first electrodes 11 are set to be substantially equal. In addition, the respective first electrodes 11 and the respective second electrodes 12 are disposed so that both ends of the electrode edge formed by connecting two sides of different sloping directions and the space between the first electrodes 11 do not overlap. Even with this kind of electrode structure, it is possible to realize a structure where the pixel edge of the portion demarcated by the electrode edge of the second electrodes 12 and the alignment direction of the liquid crystal layer center molecules do not become orthogonal. Note that, while a case is illustrated where the liquid crystal layer 3 may be set to a left 90° twisted alignment regarding the directions 13 and 14 of the alignment treatment, the liquid crystal layer 3 may also be set to the right 90° twisted alignment (the same applies to FIGS. 13A and 13B onward). Moreover, in the electrode structure shown above, Xa>Xb, and preferably Xa is set to be not greater than four times Xb (more preferably not greater than three times Xb). When the angle formed by a side having the length component Xa and the horizontal direction is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. Here, the shape of the respective pixels in the electrode structure is a hexagonal shape of a deformed "dogleg shape", and all pixels are of the same shape. Note that, with the electrode edge of the second electrode 12, while the left side (side rising to the right) is set to be relatively long and the right side (side falling to the right) is set to be relatively short, the same effect can be obtained even when the pixel shape is reversed horizontally (left-right).

FIG. 13A and FIG. 13B are schematic plan views showing another example of the electrode structure. As shown in FIG. 13A, while the electrode edge of the respective second electrodes 12 extending in the left-right direction in the diagram is formed in a saw-like shape, unlike the structure of the foregoing embodiment, one pitch of the saw teeth does not coincide with the electrode width of the respective first electrodes 11. In addition, as shown in FIG. 13B, with the respective second electrodes 12, one apex angle portion of the saw teeth and the interelectrode portion of the first electrode 11 are in a non-overlapping state. The respective upper and lower electrode edges in one pixel are formed in a shape where two sides of different sloping directions are connected. As with the foregoing electrode structure, when the length components of the respective electrode edges that are parallel in the left-right direction are Xa and Xb, the total length of Xa and Xb and the electrode width of the respective first electrodes 11 are set to be substantially equal. In addition, the respective first electrodes 11 and the respective second electrodes 12 are disposed so that both ends of the electrode edge formed by connecting two sides of different sloping directions and the space between the first electrodes 11 do not overlap. Even with this kind of electrode structure, it is possible to realize a structure where the pixel edge of the portion demarcated by the electrode edge of the second electrodes 12 and the alignment direction 25 (refer to FIGS. 7A and 7B) of the liquid crystal layer center molecules do not become orthogonal.

The difference between the electrode structure shown in FIGS. 13A, 13B and the electrode structure shown in FIGS. 12A, 12B is that the apexes of the saw teeth in both electrode edges of the respective second electrodes 12 are uneven. In the example shown in FIGS. 13A and 13B, one apex of the saw teeth is disposed by being displaced by substantially Xb in the left-right direction relative to the other apex. Note that the displacement is not limited to Xb. Even in the electrode structure shown above, Xa>Xb, and preferably Xa is set to be not greater than four times Xb (more preferably not greater than three times Xb). When the angle formed by a side having the length component Xa and the horizontal direction is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. While the shape of the respective pixels in the electrode structure of FIGS. 13A and 13B is of a deformed hexagonal shape, the shape of pixels that are adjacent in the vertical direction is different, and the difference in shape is repeated for every other second electrode 12. Note that, as with the case of the electrode structure of FIGS. 12A and 12B, it is considered that the same effect can be obtained even when the pixel shape is reversed horizontally (left-right).

FIG. 14A and FIG. 14B are schematic plan views showing another example of the electrode structure. As shown in FIG. 14A, the electrode edge of the respective second electrodes 12 extending in the left-right direction in the diagram is formed in a saw-like shape, and ½ pitch of the saw teeth is set to be substantially equal to the electrode width of the respective first electrodes 11. In addition, as shown in FIG. 14B, the respective second electrodes 12 are disposed in a state where one apex angle portion (bending point) of the saw teeth and the interelectrode portion of the first electrode 11 are in an overlapped state. Since the region where the respective first electrodes 11 and the respective second electrodes 12 intersect becomes one pixel, the shape of this one pixel becomes a substantial parallelogram that is demarcated by two sides of the electrode edge of the first electrode 11 and two sides of the electrode edge of the second electrode 12. Even with this kind of electrode structure, it is possible to realize a structure where the pixel edge of the portion demarcated by the electrode edge of the second electrodes 12 and the alignment direction 25 (refer to FIGS. 7A and 7B) of the liquid crystal layer center molecules do not become orthogonal. In FIGS. 14A and 14B, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. With the respective pixels in the electrode structure of FIGS. 14A and 14B, the pixels that are adjacent in the vertical direction have the same shape. However, the shape of pixels that are adjacent in the left-right direction is different, and the difference in shape is repeated for every other first electrode 11.

Figure 15A:
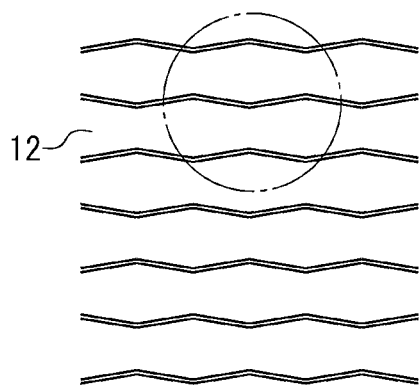
FIG. 15A and FIG. 15B are schematic plan views showing another example of the electrode structure.
Figure 15B:
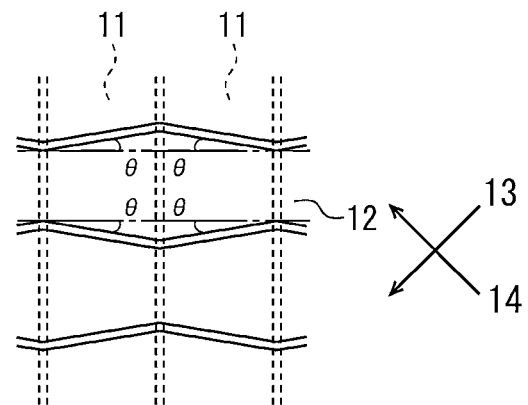

FIG. 15A and FIG. 15B are schematic plan views showing another example of the electrode structure. As shown in FIG. 15A, the electrode edge of the respective second electrodes 12 extending in the left-right direction in the diagram is formed in a saw-like shape, and one pitch of the saw teeth is set to be substantially equal to the electrode width of the respective first electrodes 11. The difference with the electrode structure of FIGS. 14A and 14B is that the bending directions of one electrode edge and the other electrode edge of the respective second electrodes 12 are alternated, and the bent apexes of both electrode edges approaching each other and separating from each other are repeated. In addition, as shown in FIG. 15B, the respective second electrodes 12 are disposed in a state where one apex angle portion (bending point) of the saw teeth and the interelectrode portion of the first electrode 11 are in an overlapped state. Since the region where the respective first electrodes 11 and the respective second electrodes 12 intersect becomes one pixel, the shape of this one pixel becomes a substantial trapezoid that is demarcated by two sides of the electrode edge of the first electrode 11 and two sides of the electrode edge of the second electrode 12. In FIGS. 15A and 15B, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. With the respective pixels in the electrode structure of FIGS. 15A and 15B, the pixels that are adjacent in the vertical direction and the pixels that are adjacent in the left-right direction both have different shapes, and the difference in shape is repeated for every other first electrode 11 and the same different shape for every other second electrode 12.

Figure 16A:
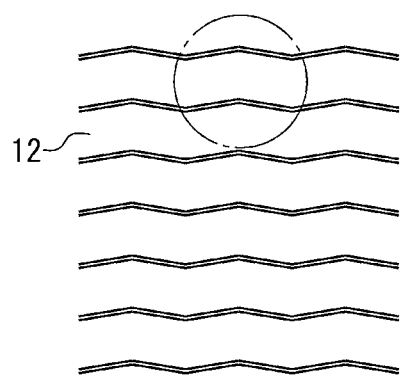
FIG. 16A and FIG. 16B are schematic plan views showing another example of the electrode structure.
Figure 16B:
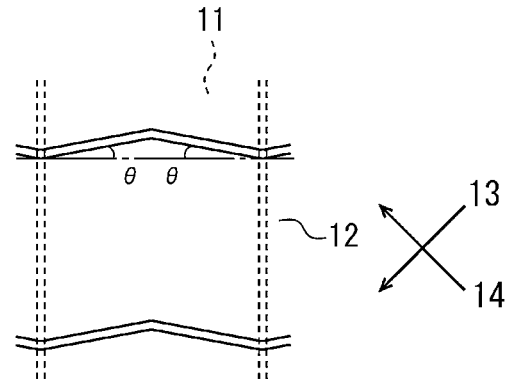

FIG. 16A and FIG. 16B are schematic plan views showing another example of the electrode structure. As shown in FIG. 16A, the electrode edge of the respective second electrodes 12 extending in the left-right direction in the diagram is formed in a saw-like shape, and one pitch of the saw teeth is set to be substantially equal to the electrode width of the respective first electrodes 11. In addition, as shown in FIG. 16B, the respective second electrodes 12 are disposed in a state where one apex angle portion (bending point) of the saw teeth overlaps with the substantial center part of the first electrodes 11, and the other apex angle portion (bending point) overlaps with the interelectrode portion of the first electrodes 11. Since the region where the respective first electrodes 11 and the respective second electrodes 12 intersect becomes one pixel, the shape of this one pixel becomes a substantial reverse V-shaped hexagon that is demarcated by two sides of the electrode edge of the first electrode 11 and two sides of the electrode edge of the second electrode 12. In FIGS. 16A and 16B, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. With the respective pixels in the electrode structure of FIGS. 16A and 16B, the pixels that are adjacent in the vertical direction and the pixels that are adjacent in the left-right direction both have the same shape. Note that the shape of the respective pixels may also be a substantial V-shaped hexagon.

FIG. 17A and FIG. 17B are schematic plan views showing another example of the electrode structure. As shown in FIG. 17A, the electrode edge of the respective second electrodes 12 extending in the left-right direction in the diagram is formed in a saw-like shape, and one pitch of the saw teeth is set to be substantially equal to the electrode width of the respective first electrodes 11. The difference with the electrode structure of FIGS. 16A and 16B is that the bending directions of one electrode edge and the other electrode edge of the respective second electrodes 12 are alternated, and the bending points of both electrode edges approaching each other and separating from each other are repeated. In addition, as shown in FIG. 17B, the respective second electrodes 12 are disposed in a state where one bending point (apex) of the saw teeth overlaps with the substantial center part of the first electrodes 11, and the other bending point (apex) overlaps with the interelectrode portion of the first electrodes 11. Since the region where the respective first electrodes 11 and the respective second electrodes 12 intersect becomes one pixel, the shape of this one pixel becomes a substantial hexagonal shape that is demarcated by two sides of the electrode edge of the first electrode 11 and two sides of the electrode edge of the second electrode 12. In FIG. 17B, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. With the respective pixels in this electrode structure, the pixels that are adjacent in the vertical direction have different shapes, and the pixels that are adjacent in the left-right direction have the same shape.

In all of the electrode structures described above, the electrode edge on either side of the second electrode was formed in a broken curve shape. However, it is also to form only the electrode edge on one side in a broken curve shape. In the foregoing case, the line segment that intersects obliquely is desirably disposed on the anti-viewing side of the pixel edge.

FIG. 18A and FIG. 18B are schematic plan views showing another example of the electrode structure. As shown in FIG. 18A, the electrode edge of the respective first electrodes 11 extending in the vertical direction in the diagram is formed in a saw-like shape, and one pitch of the saw teeth is set to be substantially equal to the electrode width of the respective second electrodes 12. Moreover, the electrode edge of the respective second electrodes 12 extending in the left-right direction in the diagram is formed in a saw-like shape as with the foregoing embodiment, and one pitch of the saw teeth is set to be substantially equal to the electrode width of the respective first electrodes 11. As shown in FIG. 18B, the respective first electrodes 11 are disposed in a state where one apex angle portion (bending point) of the saw teeth overlaps with the substantial center part of the second electrodes 12, and the other apex angle portion (bending point) overlaps with the interelectrode portion of the second electrodes 12. Similarly, the respective second electrodes 12 are disposed in a state where one apex angle portion (bending point) of the saw teeth overlaps with the substantial center part of the first electrodes 11, and the other apex angle portion (bending point) overlaps with the interelectrode portion of the first electrodes 11. Since the region where the respective first electrodes 11 and the respective second electrodes 12 intersect becomes one pixel, the shape of this one pixel becomes a hexagonal shape that is demarcated by two sides of the electrode edge of the first electrode 11 and two sides of the electrode edge of the second electrode 12. Note that the shape of the respective pixels may also be a substantial V-shaped hexagon.

In FIG. 18B, when the angle formed by electrode edge of the first electrode 11 and the vertical direction (up-down direction in the diagram) is defined as θ, the angle θ is set to be from greater than 0° to 15° or below. It is thereby possible to realize a structure where the two sides (upper and lower sides) of the respective pixels and the alignment direction of the liquid crystal layer center molecules do not become orthogonal. With the respective pixels in this electrode structure, the pixels that are adjacent in the vertical direction and the pixels that are adjacent in the left-right direction both have the same shape. Moreover, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. Moreover, by adopting an electrode structure having flexibility on both the first electrode side and the second electrode side, it is possible to yield the effect of decreasing the lower limit of the frame frequency. The value of θ in the foregoing case is preferably 5° or more. Meanwhile, in order to further improve the display uniformity from the anti-viewing direction, it is considered that θ is preferably set to 10° or more and 15° or less. Note that, in FIGS. 18A and 18B, while the electrode edges on either side of the first electrodes and the second electrodes had the same shape, they may also have different shapes.

Meanwhile, in an electrode structure where the pixel edge of the portion that is demarcated by the electrode edges of the second electrodes and the alignment direction of the liquid crystal layer center molecules do not become orthogonal, by additionally providing rectangular openings to the respective first electrodes 11, the frame frequency can be decreased. This is explained in detail below.

Figure 19:
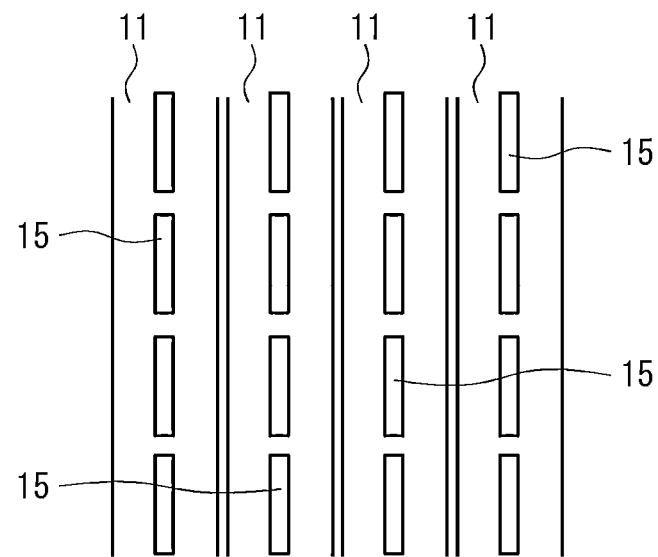
FIG. 19 is a diagram showing an example of the electrode structure of the first electrode with openings.
Figure 20:
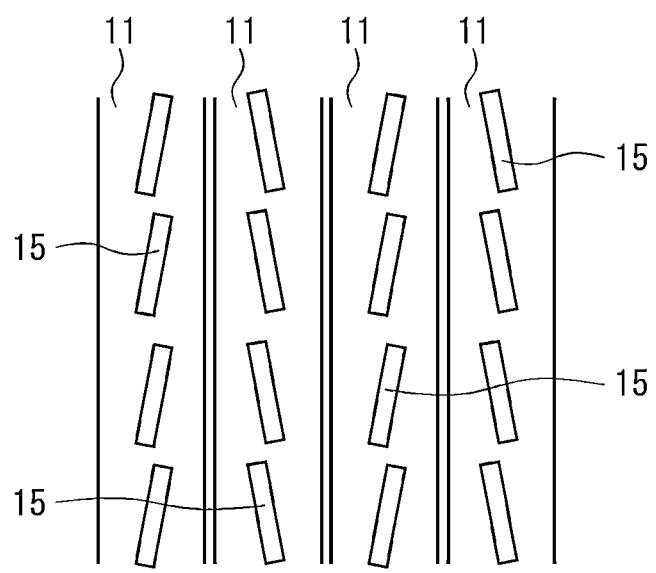
FIG. 20 is a diagram showing an example of the electrode structure of the first electrode with openings.

FIG. 19 is a diagram showing an example of the electrode structure of the first electrode with openings. As shown in FIG. 19, the respective first electrodes 11 are provided with rectangular openings extending along the first direction, which is the extending direction of the respective first electrodes 11. In the illustrated example, the longitudinal direction of the respective openings 15 is substantially parallel to or anti-parallel to the first direction, and the respective openings 15 are arranged along the longitudinal direction. Note that the longitudinal direction of the respective openings 15 may also be disposed at a predetermined angle relative to the first direction as shown in FIG. 20. For example, the longitudinal direction of the respective openings 15 may be a direction that is substantially orthogonal to the electrode edge of the second electrodes 12. Moreover, in the illustrated example, the sloping directions of the respective openings between the adjacent first electrodes 11 are alternated, the sloping directions may also coincide.

The structure of the pixel configured by combining the foregoing first electrode 11 and the second electrode 12 is now explained.

Figure 21:
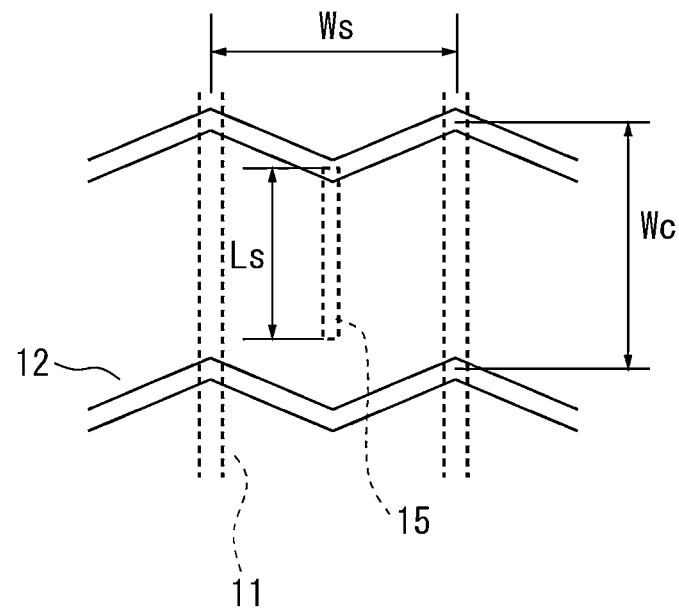
FIG. 21 is a diagram showing another example of the electrode structure.

FIG. 21 is a diagram showing another example of the electrode structure. This example is the electrode structure of one pixel in the case of combining the second electrodes 12 having the electrode structure of FIGS. 16A and 16B and the first electrodes 11 having the openings 15 shown in FIG. 19. The electrode pitch of the first electrodes 11 is Ws, the electrode pitch of the second electrodes 12 is Wc, and the long side length (longitudinal direction length) of the openings 15 provided to the first electrodes 11 is Ls. Each of the openings 15 is disposed so that one end (short side) thereof overlaps with the adjacent second electrodes 12 between the electrodes and overlaps with the bending point of the second electrodes 12.

Figure 22:
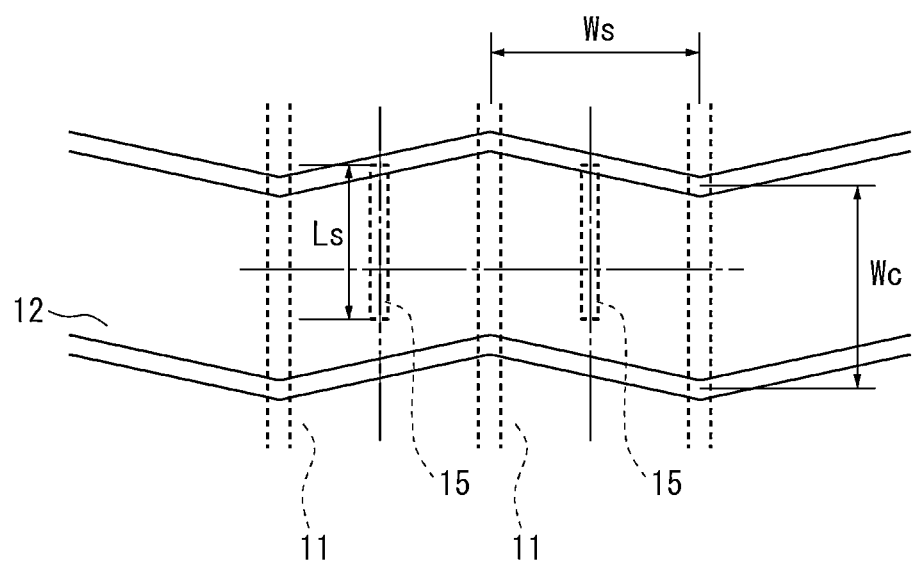
FIG. 22 is a diagram showing another example of the electrode structure.

FIG. 22 is a diagram showing another example of the electrode structure. This example is the electrode structure of one pixel in the case of combining the second electrodes 12 having the electrode structure of FIGS. 14A and 14B and the first electrodes 11 having the openings 15 shown in FIG. 19. The electrode pitch of the first electrodes 11 is Ws, the electrode pitch of the second electrodes 12 is Wc, and the long side length (longitudinal direction length) of the openings 15 provided to the first electrodes 11 is Ls. Each of the openings 15 is disposed at the substantial center relative to the width direction of the first electrodes 11 in the pixel, and is disposed so that one end (short side) thereof overlaps with the adjacent second electrodes 12 between the electrodes.

FIG. 23 is a diagram showing another example of the electrode structure. This example is the electrode structure of one pixel in the case of combining the second electrodes 12 having the electrode structure of FIGS. 14A and 14B and the first electrodes 11 having the openings 15 arranged obliquely as shown in FIG. 20. The electrode pitch of the first electrodes 11 is Ws, and the electrode pitch of the second electrodes 12 is Wh. Moreover, the long side length (longitudinal direction length) of the openings 15 arranged obliquely provided to the first electrodes 11 is Lt. In this example, the openings 15 are disposed to include the center of gravity (shown with intersecting dashed lines in the diagram) of the pixel.

In addition to the several combinations illustrated above, the various electrode structures of the second electrode 12 and the respective electrode structures of the first electrodes 11 shown in FIG. 20 and FIG. 21 may be suitably combined. Moreover, two or more openings may be provided to the respective pixels. By providing a plurality of openings, it is considered that the lower limit of the frame frequency can be further decreased.

Meanwhile, in an electrode structure where the pixel edge of the portion that is demarcated by the electrode edges of the second electrodes and the alignment direction of the liquid crystal layer center molecules do not become orthogonal, the frame frequency can also be decreased by causing the respective pixels to have a pixel edge that extends in one direction. This is explained in detail below.

FIG. 24A and FIG. 24B are schematic plan views shown an example of the electrode structure. As shown in FIG. 24A, the electrode edge of the respective second electrodes 12 extending in the left-right direction in the diagram is formed in a saw-like shape, and ¼ pitch of the saw teeth is set to be substantially equal to the electrode width of the respective first electrodes 11. In addition, as shown in FIG. 24B, the respective second electrodes 12 are disposed in a state where one apex angle portion (bending point) of the saw teeth and the interelectrode portion of the first electrode 11 are in an overlapped state. Since the region where the respective first electrodes 11 and the respective second electrodes 12 intersect becomes one pixel, the shape of this one pixel becomes a substantial parallelogram extending in one direction that is demarcated by two sides of the electrode edge of the first electrode 11 and two sides of the electrode edge of the second electrode 12. In FIG. 24B, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. With the respective pixels in this electrode structure, the pixels that are adjacent in the vertical direction have the same shape, but there are two types of pixel edge shapes that change for each bending point. In the illustrated example, while two first electrodes 11 are disposed mutually between the bending points of the respective second electrodes 12, three or more first electrodes 11 may also be disposed. In other words, the electrode width of the respective second electrode 12 may be set to substantially ½ of the electrode width of the first electrodes 11.

FIG. 25A and FIG. 25B are schematic plan views shown an example of the electrode structure. As shown in FIG. 25A, the electrode edge of the respective second electrodes 12 extending in the left-right direction in the diagram is formed in a saw-like shape, and ¼ pitch of the saw teeth is set to be substantially equal to the electrode width of the respective first electrodes 11. The difference with the electrode structure of FIGS. 24A and 24B is that the bending directions of one electrode edge and the other electrode edge of the respective second electrodes 12 are alternated, and the bent apexes of both electrode edges approaching each other and separating from each other are repeated. In addition, as shown in FIG. 25B, the respective second electrodes 12 are disposed in a state where one apex angle portion (bending point) of the saw teeth and the interelectrode portion of the first electrode 11 are in an overlapped state. Since the region where the respective first electrodes 11 and the respective second electrodes 12 intersect becomes one pixel, the shape of this one pixel becomes a substantial trapezoid extending in one direction that is demarcated by two sides of the electrode edge of the first electrode 11 and two sides of the electrode edge of the second electrode 12. In the illustrated example, while two first electrodes 11 are disposed mutually between the bending points of the respective second electrodes 12, three or more first electrodes 11 may also be disposed. In other words, the electrode width of the respective second electrode 12 may be set to substantially ½ of the average value of the widest portion and the narrowest portion among the electrode widths of the first electrodes 11. In FIG. 25B, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. With the respective pixels in the electrode structure of type B, the pixels that are adjacent in the vertical direction and the pixels that are adjacent in the left-right direction both have different shapes, and there are four types of pixel edge shapes.

FIG. 26A and FIG. 26B are schematic plan views shown an example of the electrode structure. As shown in FIG. 26A, the electrode edge of the respective second electrodes 12 extending in the left-right direction in the diagram is formed in a saw-like shape, and ½ pitch of the saw teeth is set to be substantially equal to the electrode width of the respective first electrodes 11. In addition, as shown in FIG. 26B, the respective second electrodes 12 are disposed in a state where one apex angle portion (bending point) of the saw teeth and the interelectrode portion of the first electrode 11 are in an overlapped state. Since the region where the respective first electrodes 11 and the respective second electrodes 12 intersect becomes one pixel, the shape of this one pixel becomes a substantial diamond extending in one direction that is demarcated by two sides of the electrode edge of the first electrode 11 and two sides of the electrode edge of the second electrode 12. In the illustrated example, while two first electrodes 11 are disposed mutually between the bending points of the respective second electrodes 12, three or more first electrodes 11 may also be disposed. In other words, the electrode width of the respective second electrode 12 may be set to substantially ½ of the electrode width of the first electrodes 11. In FIG. 26B, when the angle formed by electrode edge of the second electrode 12 and the horizontal direction (left-right direction in the diagram) is defined as θ, the angle θ is set to be from greater than 0° to 15° or below. It is thereby possible to realize a structure where the two sides (upper and lower sides) of the respective pixels and the alignment direction 25 (refer to FIGS. 7A and 7B) of the liquid crystal layer center molecules do not become orthogonal. With the respective pixels in this electrode structure, the pixels that are adjacent in the vertical direction and the pixels that are adjacent in the left-right direction both have the same shape.

Figure 27A:
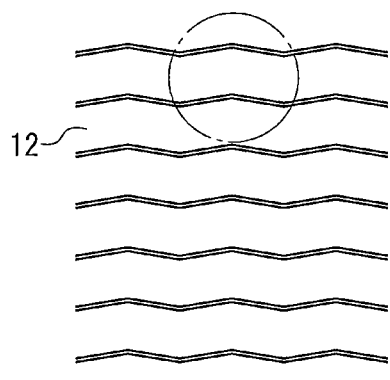
FIG. 27A and FIG. 27B are diagrams showing another example of the electrode structure.
Figure 27B:
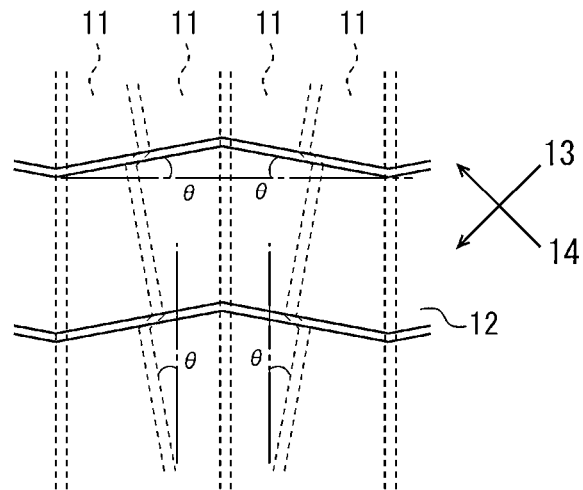

FIG. 27A and FIG. 27B are schematic plan views shown an example of the electrode structure. The electrode structure shown in FIGS. 27A and 27B is configured by causing the respective first electrodes 11 to have flexibility and causing the electrode edge to have a broken curve shape in the electrode structure of FIGS. 24A and 24B described above. Specifically, as shown in FIG. 27B, with the respective first electrodes 11, one electrode edge is formed in a straight line shape and the other electrode edge is formed in a saw-like shape. Moreover, in this example, two first electrodes 11 disposed so that their mutual electrode edge sides in a saw-like shape face each other form a pair, and this pair of first electrodes 11 is repeatedly disposed. The usage efficiency of the space for disposing the first electrode 11 can thereby be increased. Note that the case shown in FIG. 27A and FIG. 27B is merely one example, and both electrode edges of the respective first electrodes 11 may also be formed in a saw-like shape. Moreover, the first electrodes 11 in which one or both electrode edges are formed in a broken curve shape may also be combined with the various types of electrode structures described above.

Note that the present invention is not limited to the foregoing embodiments, and may be variously modified and worked. For example, the numerical conditions described in the foregoing embodiments are merely examples. Moreover, the angle of the twisted alignment of the liquid crystal layer is not limited to 90°, and, for example, such angle may be suitably set within a range that is from greater than 0° to 250° or below.

What is claimed is:

1. A liquid crystal display comprising:
   a first substrate and a second substrate placed opposite each other;
   a first electrode which is provided on one face of the first substrate and which extends in a first direction;
   a second electrode which is provided on one face of the second substrate and which extends in a second direction that intersects with the first direction; and
   a liquid crystal layer provided between the one face of the first substrate and the one face of the second substrate,
   wherein a pixel is formed in a region where the first electrode and the second electrode intersect,
   wherein a pixel edge of the pixel has a line segment which is oblique relative to the first direction,
   wherein at least one of the first substrate and the second substrate is subject to alignment treatment,
   wherein the liquid crystal layer has a substantial vertical alignment having a twisted structure, and an alignment direction of liquid crystal molecules at a substantial center in a layer thickness direction and the oblique line segment are not orthogonal, and
   wherein the oblique line segment forms an oblique angle of from greater than 0° to 15° or below relative to the second direction.

2. The liquid crystal display according to claim 1, wherein the alignment direction of the liquid crystal molecules at the substantial center in the layer thickness direction is substantially parallel to or anti-parallel to the first direction.

3. The liquid crystal display according to claim 1, wherein the oblique line segment is disposed on an anti-viewing direction side of the pixel edge.

4. A liquid crystal display comprising:
   a first substrate and a second substrate placed opposite each other;
   a first electrode which is provided on one face of the first substrate and which extends in a first direction;
   a second electrode which is provided on one face of the second substrate and which extends in a second direction that intersects with the first direction; and
   a liquid crystal layer provided between the one face of the first substrate and the one face of the second substrate,
   wherein a pixel is formed in a region where the first electrode and the second electrode intersect,
   wherein a pixel edge of the pixel has a line segment which is oblique relative to the first direction,
   wherein at least one of the first substrate and the second substrate is subject to alignment treatment,
   wherein the liquid crystal layer has a substantial vertical alignment having a twisted structure, and an alignment direction of liquid crystal molecules at a substantial center in a layer thickness direction and the oblique line segment are not orthogonal,
   wherein the oblique line segment is configured by connecting a first straight line and a second straight line extending in different directions,
   wherein the first straight line and the second straight line are of a relation where, when a length of the first straight line and a length of the second straight line projected in the first direction are respectively Xa and Xb, Xa is three times or more than Xb, and
   wherein the first straight line forms an oblique angle of from greater than 0° to 15° or below relative to the second direction.

5. The liquid crystal display according to claim 4, wherein the alignment direction of the liquid crystal molecules at the substantial center in the layer thickness direction is substantially parallel to or anti-parallel to the first direction.

6. The liquid crystal display according to claim 4, wherein the oblique line segment is disposed on an anti-viewing direction side of the pixel edge.

7. A liquid crystal display comprising:
   a first substrate and a second substrate placed opposite each other;
   a first electrode which is provided on one face of the first substrate and which extends in a first direction;
   a second electrode which is provided on one face of the second substrate and which extends in a second direction that intersects with the first direction; and a liquid crystal layer provided between the one face of the first substrate and the one face of the second substrate, wherein a pixel is formed in a region where the first electrode and the second electrode intersect, wherein a pixel edge of the pixel has a line segment which is oblique relative to the first direction, wherein at least one of the first substrate and the second substrate is subject to alignment treatment, wherein the liquid crystal layer has a substantial vertical alignment having a twisted structure, and an alignment direction of liquid crystal molecules at a substantial center in a layer thickness direction and the oblique line segment are not orthogonal, wherein the oblique line segment is configured by a first straight line and a second straight line of which lengths are substantially equal, and which extend in different directions respectively, and wherein each of the first straight line and the second straight line forms an oblique angle of from greater than 0° to 15° or below relative to the second direction.

8. The liquid crystal display according to claim 7, wherein the alignment direction of the liquid crystal molecules at the substantial center in the layer thickness direction is substantially parallel to or anti-parallel to the first direction.

9. The liquid crystal display according to claim 7, wherein the oblique line segment is disposed on an anti-viewing direction side of the pixel edge.

\* \* \* \* \*